(12) United States Patent
Dorgan et al.

(10) Patent No.: US 8,569,428 B2
(45) Date of Patent: Oct. 29, 2013

(54) HIGH MODULUS POLYMER COMPOSITES AND METHODS OF MAKING THE SAME

(76) Inventors: John R. Dorgan, Golden, CO (US); Birgit Braun, Golden, CO (US)

( * ) Notice: Subject to any disclaimer, the term of this patent is extended or adjusted under 35 U.S.C. 154(b) by 360 days.

(21) Appl. No.: 12/480,599

(22) Filed: Jun. 8, 2009

(65) Prior Publication Data
US 2009/0292046 A1 Nov. 26, 2009

Related U.S. Application Data

(62) Division of application No. 11/372,987, filed on Mar. 10, 2006, now abandoned.

(60) Provisional application No. 60/660,972, filed on Mar. 11, 2005.

(51) Int. Cl.
*C08G 63/08* (2006.01)
*C08G 63/06* (2006.01)
*C08G 63/02* (2006.01)
*C08K 7/02* (2006.01)

(52) U.S. Cl.
USPC .......... 525/450; 525/418; 524/13; 524/9; 428/407; 428/403

(58) Field of Classification Search
USPC ......... 524/9, 13, 15, 702, 703, 733, 734, 788, 524/791, 878; 525/437, 450, 418
See application file for complete search history.

(56) References Cited

U.S. PATENT DOCUMENTS

| | | | |
|---|---|---|---|
| 3,080,256 A | 3/1963 | Bundy | |
| 3,109,743 A | 11/1963 | Fleck, Jr. et al. | |
| 3,332,833 A * | 7/1967 | Guthrie | 162/146 |
| 3,485,777 A | 12/1969 | Gaylord | |
| 3,518,221 A | 6/1970 | Kenyon et al. | |
| 3,754,956 A | 8/1973 | Durrant | |
| 3,963,512 A | 6/1976 | Swift | |
| 4,317,765 A | 3/1982 | Gaylord | |
| 4,415,703 A | 11/1983 | Toba et al. | |
| 4,420,341 A | 12/1983 | Ferrigno | |
| 4,464,510 A | 8/1984 | Czvikovskzky | |
| 4,478,963 A | 10/1984 | McGarry | |
| 4,481,076 A | 11/1984 | Herrick | |
| 4,697,007 A | 9/1987 | Seitz et al. | |
| 4,791,020 A | 12/1988 | Kokta | |
| 5,008,310 A | 4/1991 | Beshay | |
| 5,283,279 A | 2/1994 | Hara et al. | |
| 5,422,386 A | 6/1995 | Fries | |
| 5,696,183 A | 12/1997 | Sarraf | |
| 5,962,550 A | 10/1999 | Akahane et al. | |
| 6,103,790 A | 8/2000 | Cavaille et al. | |
| 6,114,495 A * | 9/2000 | Kolstad et al. | 528/354 |
| 6,117,545 A | 9/2000 | Cavaille et al. | |
| 6,124,384 A * | 9/2000 | Shiraishi et al. | 524/35 |
| 6,207,775 B1 | 3/2001 | Marti | |
| 6,541,627 B1 | 4/2003 | Ono et al. | |
| 6,703,497 B1 | 3/2004 | Ladouce et al. | |
| 6,863,971 B2 | 3/2005 | Halahmi | |
| 6,946,028 B1 | 9/2005 | Craig | |
| 6,967,027 B1 | 11/2005 | Heux et al. | |
| 7,071,259 B2 | 7/2006 | Botros | |
| 2004/0177935 A1 | 9/2004 | Hamed et al. | |
| 2006/0235113 A1 | 10/2006 | Dorgan et al. | |
| 2008/0118765 A1 * | 5/2008 | Dorgan et al. | 428/532 |

FOREIGN PATENT DOCUMENTS

| | | | |
|---|---|---|---|
| CN | 1362447 A | * | 8/2002 |
| JP | 11-255870 | * | 9/1999 |
| JP | 2004-359840 | * | 12/2004 |
| WO | WO 2005/003450 A1 | * | 1/2005 |

OTHER PUBLICATIONS

Oksman et al., Composites Science and Technology, 2003, 63, 1317-1324.*
Yamashita et al., Bamboo Journal, 2004, 21, 35-45.*
Huda et al. "Physico-mechanical Properties of "Green" Composites from Polylactic Acid PLA) and Cellulose Fibers" GPEC 2004, Detroit, USA, pp. 1-12.*
Li et al., CN 1362447 A (Aug. 2002); abstract and translation in English.*
Huda et al., J. Mat. Sci., 2005, 40, 4221-4229.*
Funabashi, M.; Kunioka, M. Macromol. Symp. 2005, 224, 309-321.*
Matthew, A. P.; Oksman, K.; Sain, M. J. Appl. Polym. Sci. 2005, 97, 2014-2025.*
Oksman, et al., "Natural fibres as reinforcement in polylactic acid (PLA) composites", Composites Science and Technology, 2003, vol. 63, No. 9, pp. 1317-1324.
Huda, et al., "Effect of processing conditions on the physico-mechanical properties of cellulose fiber reinforced poly (lactic acid)", ANTEC 2004 Plastics: Annual Technical Conference, 2004, vol. 2, Materials 2, pp. 1614-1618.
Huda, et al., "Physico-mechanical properties of 'Green' Composites from poly(lactic acid) and cellulose fibers", at GPEC, 2004, Detroit, USA, pp. 1-12.
Porter, et al., "Compatibility and transesterification in binary polymer blends", Polymer, 1992, vol. 33, No. 10, pp. 2019-2030.
Elekeiroz, maleic anhydride material data sheet, 2004, 1 page.
Mohanty et al., "Sustainable Bio-Composites from Renewable Resources: Opportunities and Challenges in the Green Materials World", Journal of Polymers and the Environment, 10, No. 1/2: Apr. 19-26, 2002.
Serizawa et al. "Kenaf-Fiber-Reinforced Poly(lactic acid) Used for Electronic Products", Journal of Applied Polymer Science, 100: 618-624, 2006.
Bhardwaj et al. "Advances in the Properties of Polylactides Based Materials: A Review", Journal of Biobased Materials and Bioenergy, 1: 191-209, 2007.

(Continued)

*Primary Examiner* — Rip A. Lee
(74) *Attorney, Agent, or Firm* — Sheridan Ross P.C.

(57) ABSTRACT

The invention provides methods of producing composite polymers by combining fillers with polymers in the presence of pre-formed high molecular weight polymer. Monomer polymerization can be initiated through the addition of initiators or by reactive chemical groups on the surface of the fibers. The composite materials formed possess superior mechanical properties compared to similar polymer composites made by either purely mechanical mixing or solely polymerization of monomers in the presence of the fillers.

9 Claims, 9 Drawing Sheets

(56) References Cited

OTHER PUBLICATIONS

Ray et al., "Biodegradable polymers and their layered silicate nanocomposites: In greening the 21st century materials world", Progress in materials Science 50: 962-1079, 2005.

Samir et al., "Review of Recent Research into Cellulosic Whiskers, Their Properties and Their Application in Nanocomposite Field", Biomacromolecules 6: 612-26, 2005.

Peterson et al., "Structure and thermal properties of poly(lactic acid)/cellulose whiskers nanocomposite materials", Composites Science and Technology 67: 2535-2544, 2007.

Nielsen et al., Mechanical Properties of Polymers and Composites, Marcel Bekker, New York, 1994: 377-513.

Takemori "Towards an understanding of the heat deflection temperature of thermoplastics", Polymer Science and Engineering 19(15), pp. 1104-1109, 1979.

* cited by examiner

HIGH MODULUS POLYMER COMPOSITES AND METHODS OF MAKING THE SAME

CROSS REFERENCE TO RELATED APPLICATION

This application is a divisional patent application of U.S. patent application Ser. No. 11/372,987, filed Mar. 10, 2006, now abandoned, which claims the benefit of priority under 35 U.S.C. §119(e)from U.S. Provisional Patent Application No. 60/660,972 filed Mar. 11, 2005. These related applications are incorporated herein, in their entirety, by this reference.

GOVERNMENT INTEREST

This invention was made with government support under Environmental Protection Agency (EPA) grant RD-83153001-1. The government has certain rights in the invention.

FIELD OF THE INVENTION

The invention relates to polymer composites and more particularly, the invention provides novel methods of making high molecular weight filled polymeric matrices having desirable physical characteristics.

BACKGROUND OF THE INVENTION

The introduction of fibers and other fillers into a polymeric matrix is an established route to enhancing the physical properties of a chosen polymer provided good dispersion and intimate interfacial adhesion can be achieved. This method can also be very cost effective providing the filling agents are obtainable at low to moderate cost.

Previous studies have shown successful improvements in mechanical properties of polymers by the formation of microcomposites through purely physical mixing of fiber fillers into the polymer. For example, Oksman et al. (Oksman, K., M. Skrifvars, and J. F. Selin, *Natural fibres as reinforcement in polylactic acid (PLA) composites*. Composites Science and Technology, 63(9):1317-1324, 2003) embedded flax fibers into a polylactic acid (PLA) matrix and compared the resulting composite properties to polypropylene (PP) filled with the same fibers. It was found that the mechanical properties of the flax-PLA composites are promising, since the composite strength was about 50% better compared to similar flax-PP composites that are used in many industrial applications. However, microscopy studies suggested a lack of interfacial adhesion between the polymer matrix and the fiber surface. Additionally, Huda et al. (Huda, M. S., et al., *Effect of processing conditions on the physico-mechanical properties of cellulose fiber reinforced poly(lactic acid)*. ANTEC 2004 Plastics: Annual Technical Conference, Volume 2: Materials, 2:1614-1618, 2004; Huda, M. S., et al. *Physico-mechanical properties of "Green" Composites from poly(lactic acid) and cellulose fibers*, at GPEC, Detroit, USA, 2004) showed improvement of the tensile strength, tensile modulus and impact strength upon reinforcing PLA with cellulose fibers. However, the introduction of cellulose fibers did not affect the glass transition temperature significantly as measured by DSC.

Thus, there is a desire for improved polymer composites but there exits a need for an improved method of making these filled polymers to achieve the desired polymer physical characteristics rapidly and at an acceptable cost.

SUMMARY OF THE INVENTION

The technology disclosed herein is a method of making polymer composites. These methods are rapid and economically efficient ways to produce polymer composites. The polymer composites produced by these methods have desirable physical characteristics. The polymer composites produced by these methods also have a homogenous or nearly homogenous distribution of filler throughout.

The methods include the mixing of a monomer or oligomer with a pre-formed polymer in the presence of a filler to initiate an interchange reaction between a grafted layer of monomer or oligomer on the surface of the filler and the pre-formed polymer, leading to the formation of a composite polymer.

In one embodiment, a method of forming a composite polymer includes mixing a filler simultaneously with a monomer that can react to form a grafted polymer layer on the surface of the filler and a pre-formed polymer. In this process, an interchange reaction takes place between a grafted layer or monomer or oligomer on the surface of the filler and the pre-formed polymer, to form a composite polymer.

In this reaction, the filler may be an organic filler such as wood fiber, wood flour, starch, straws, bagasse, coconut hull/fiber, cork, corn cob, corn stover, cotton, gilsonite, nutshell, nutshell-flour, rice hull, sisal, hemp or soybean.

Alternatively, the filler may be an inorganic filler such as a mineral, calcium carbonate, montmorillonite, kaolin, titanium dioxide, alumina trihydrate, wollastonite, talc, silica, quartz, barium sulfate, antimony oxide, mica, magnesium hydroxide, calcium sulfate, feldspar, nepheline syenite, microspheres, carbon black, glass, glass fibers, carbon fibers, metallic particles, magnetic particles, buckminsterfullerene, carbon nanotubes, carbon nanoparticles, silicas, cellulosic nanofibers, synthetic silicates or synthetically prepared nanoparticles. In a preferred embodiment, the filler is cellulose that has been pre-treated with alkali prior to the mixing.

The monomer(s) used in these methods may be any monomer or oligomer capable of interacting with the filler, and particularly, interacting with surface groups on the surface of the filler, and also capable of participating in the interchange reaction with the chosen pre-formed polymer. While these characteristics are necessarily dependent upon the chosen filler and pre-formed polymer to be used in these reactions, exemplary monomers include L-lactide, D-lactide, LD-lactide, caprolactone, caprolactam, ring opening monomers, ethylene glycol-terphthalic acid, sebacoyl chloride—1,6 hexadiamine, step reaction monomers, ethylene, propylene, styrene, methyl methacrylate, and vinyl monomers.

The pre-formed polymer(s) are similarly any polymer capable of participating in the interchange reaction with the filler and the monomer. Exemplary polymers for use as the pre-formed polymer in these processes include poly-lactic acid (PLA), polycaprolactone, poly(ethylene terephthalate), polyesters, polycaprolactam (Nylon 6), poly(hexamethyl sebacamide) (Nylon 6,10), polyamides, polyurethanes, polycarbonates, polyolefins, polyethylene, polybutadiene, polypropylene, polystyrene and polymethylmethacrylate.

In certain embodiments, catalysts may be used to increase the initiation rate or polymerization rate of the monomer(s) or to increase the rate of the interchange reactions or both. The polymerization and interchange reactions can be stopped through the use of a compound that deactivates one or more catalysts used in these processes.

Exemplary catalyst of the interchange reactions include titanium(IV) isopropoxide (TIP), dibutyl tin oxide (DBTO), an alkyl tin(IV) compound, monobutyltin trichloride ($BuSnCl_3$), TBD (1,5,7-triazabiscyclo[4.4.0]dec-5-ene), acid catalysts, sulfonic and sulfuric acids, base catalysts, sodium methylate, sodium methoxide, potassium methoxide, sodium hydroxide and potassium hydroxide, organic bases, triethylamine, piperidine, 1,2,2,6,6-pentamethylpiperidine, pyridine, 2,6-di-tert-butylpiridine, 1,3-Disubstituted tetrakis (fluoroalkyl)distannoxanes, 4-dimethyl-aminopyridine (DMAP) and guanidine, alkaline metal alkoxides and hydroxides, basic zeolites, cesium-exchanged NaX faujasites, mixed magnesium-aluminum oxides, magenesium oxide and barium hydroxide, 4-(dimethylamino)pyridine (DMAP), 4-pyrolidinopyridine (PPY), salts of amino acids, and enzyme transesterification catalysts.

Examples of particularly preferred combinations of monomers and pre-formed polymers include (monomer/pre-formed polymer) lactide/polylactide, ethylene glycol-terphthalic acid/poly(ethylene terphthalate), ethylene/polyethylene, an ester/poly(ester), a polycarbonate/a poly(ester), and, a polyamide/a poly(ester).

In one embodiment, a method of mixing cellulose fibers with lactide and polylactic acid to form a premix and then contacting this premix with a composition including stannous octoate, triphenylphosphine, and titanium isopropoxide, to produce a composite polymer and then contacting the composite polymer with poly(acrylic acid) to form a stabilized composite polymer is provided.

Additional embodiments include composite polymers made by mixing a filler with a monomer that can react to form a grafted polymer layer on the surface of the filler and a pre-formed polymer to produce an interchange reaction between a grafted layer on the surface of the filler and the pre-formed polymer to form a composite polymer. In one embodiment, this composite polymer is produced using a cellulose filler, lactide monomers and pre-formed polylactic acid (PLA).

This preferred polymer may be mixed in the presence of a catalyst such as titanium(IV) isopropoxide (TIP), stannous octoate $Sn(Oct)_2$, triphenylphosphine, and/or mixtures thereof.

DETAILED DESCRIPTION OF THE INVENTION

The quality of polymer composites are influenced by various factors, including, principally 1) the aspect ratio of the filler particle (fiber or other geometry) used, 2) the particle orientation, 3) the volume fraction of filler, 4) the dispersion of particles in the polymeric matrix, and 5) the interfacial adhesion between the particle surface and the surrounding matrix.

The interaction between the filler surface and the polymer matrix is an especially important factor for the reinforcement potential of the filler. In general, macroscopic reinforcing elements always contain imperfections. Structural perfection is greater as the filler becomes smaller and smaller. However, the competing effect of increasing specific surface area with decreasing size has to be considered. Additionally, in the case of a hydrophilic particle incorporated into a hydrophobic polymer, a lack of dispersion and interfacial adhesion is observed. In order to improve these factors, reactive compatibilization has been used to mix the polymer monomers with the filler. Unfortunately, this process has been hampered by the time needed to produce a composite polymer with an average high molecular weight and insufficient mixing of the filler within the formed polymer.

The methods described herein overcome these problems with reactive compatibilization resulting in composites with superior physical characteristics to those formed by conventional means. The methods of the present invention include the mixing of a polymer filler with both a low molecular weight monomer or oligomer and a pre-formed high molecular weight polymer. The monomers polymerize to become chemically grafted onto the filler and undergo an interchange reaction with the pre-formed high molecular weight polymers thereby greatly decreasing the time needed to form a composite polymer. This reactive process also maintains a high viscosity leading to greater stress within the mixture which aides in dispersing the filler within the composite polymer.

The filler used in these processes can be any suitable filler that can react with the monomer or oligomer. The polymer system chosen may be any combination of polymers that are capable of participating in interchange reactions. One or more initiators or catalysts of the polymerization reaction can be added to the reaction mixture. Additionally, one or more catalysts for the interchange reaction can be added to the reaction mixture. Preferably, the chosen filler has a reactive surface capable of initiating the polymerization reaction of the monomers during mixing. When surface groups are employed as initiators for the polymerization, there are two major competing factors to be considered: 1) in polymerization reactions, a high conversion rate of monomer is desired and therefore a high number of initiating groups is advantageous, 2) to obtain good mechanical properties, a high molecular weight of the polymer is required. High molecular weight implies a low number of polymer chains, corresponding to a low number of initiating groups.

The simultaneous introduction of the monomer and high molecular-weight, pre-formed polymer is able to address these competing factors. The monomer polymerization is initiated from the reactive surface groups on the fiber or particle surface. The presence of pre-formed high molecular-weight polymer ensures a higher average molecular weight of polymer chains grafted to the fiber surface. The resulting material consists of high-molecular weight polymer chains grafted to the particle surface in a polymer matrix. The resulting composites show improved interfacial adhesion and better dispersion properties. In addition, having high molecular weight polymer present initially means the viscosity is high so that more stress is transmitted during shearing of the sample, this leads to more effective dispersive mixing.

Examples of fillers useful in the methods of the present invention include, but are not limited to, organic based fillers and combinations thereof like, wood fiber, wood flour, starch, straws, bagasse, coconut hull/fiber, cork, corn cob and corn stover, cotton based fillers, gilsonite based fillers, nutshell and nutshell-flour based fillers, rice hull based fillers, sisal, hemp, and soybean based fillers. In addition, mineral fillers and combinations thereof may be employed including, but not limited to, calcium carbonate, montmorillonite, kaolin and other clay-based minerals, titanium dioxide, alumina trihydrate, wollastonite, talc, silica, quartz, barium sulfate, antimony oxide, mica, magnesium hydroxide, calcium sulfate, feldspar and nepheline syenite, various types of microspheres (solid or hollow), carbon black, glass, glass fibers, carbon fibers, and various metallic or magnetic particles. This also includes any nano-sized fillers and combinations thereof including, but not limited to, montmorillonite and other clay based particles, buckminsterfullerene, carbon nanotubes, other carbon based nanoparticles, silicas, glasses, cellulosic nanofibers, synthetic silicates or any type of synthetically prepared nanoparticles. In one embodiment in which an initiator other than the filler is added to the reaction, multifunctional initiators are preferred to further increase the speed of the polymerization reaction and to encourage the formation of more highly-branched polymers.

The filler particles employed may be functionalized to enable reaction using a variety of coupling agents. Such coupling agents include, but are not limited to, silane coupling agents, titanates, zirconates, aluminates, teolomers, and others.

The monomer and polymer molecules can be chosen from a wide variety of known polymers. Preferably, the polymerization of the monomers is initiated in the presence of reactive groups on the surface of the filler. Exemplary monomer/polymer combinations include, but are not limited to, ring opening polymerization systems like lactide and polylactide, caprolactone and polycaprolactone, caprolactam/polycaprolactam (Nylon 6), and numerous others. Also, condensation polymer systems can be utilized like ethylene glycol-terphthalic acid/poly(ethylene terphthalate), sebacoyl chloride—1,6 hexadiamine/poly(hexamethyl sebacamide) (Nylon 6,10), and numerous others. Also vinyl polymer systems can be used including, but not limited to, ethylene/polyethylene, propylene/polypropylene, styrene/polystyrene, methyl methacrylate/polymethylmethacrylate, and many others. When polyester systems are utilized, the most important transreactions are alcoholysis, acidolysis, and transesterification.

Polycarbonates (PC) can also be reactively extruded with polyesters; the main reaction is the direct ester-carbonate exchange reaction. Polyamides (Nylons) can also be transreacted with polyesters or with themselves; the relevant reactions include acidolysis, aminolysis, and amidolysis (Porter, R. S. and Wang, L. H., *Compatibility and transesterification in binary polymer blends*, Polymer, 33:2019-2030; Groeninckx, G., Sarkissova, M. & Thomas, S. in Polymer Blends, Volume 1: Formulation (eds. Paul, D. R. & Bucknall, C. B.) 417-459 (John Wiley & Sons, New York, 2000). Other transreactions practicable under the present art include, but are not limited to, the transreaction of chemical functionalities between amides-ethers, esters-lactams, esters-olefins, amide-olefins, and olefins-olefins.

As noted above, the reactions may optionally be conducted in the presence of a catalyst that catalyzes the interchange reaction between the growing grafted polymer chain on the surface of the filler and the pre-formed polymer. In the case of grafted polyesters, a transesterification catalyst can be used to further decrease the time of formation of a high average molecular weight composite polymer. Suitable catalysts of the interchange reactions include titanium(IV) isopropoxide (TIP), dibutyl tin oxide (DBTO), Mono-, di-, and tetraalkyl tin(IV) compounds, monobutyltin trichloride ($BuSnCl_3$), TBD (1,5,7-triazabiscyclo[4.4.0]dec-5-ene), acid catalysts like sulfonic and sulfuric acids, base catalysts like sodium methylate, sodium methoxide, potassium methoxide, sodium hydroxide and potassium hydroxide, organic bases like triethylamine, piperidine, 1,2,2,6,6-pentamethylpiperidine, pyridine, 2,6-di-tert-butylpiridine, 1,3-disubstituted tetrakis (fluoroalkyl)distannoxanes, 4-dimethyl-aminopyridine (DMAP) and guanidine, alkaline metal alkoxides and hydroxides, basic zeolites and related solid compounds such as cesium-exchanged NaX faujasites, mixed magnesium-aluminum oxides, magenesium oxide and barium hydroxide, 4-(dimethylamino)pyridine (DMAP), 4-pyrolidinopyridine (PPY), salts of amino acids, and enzyme transesterification catalysts.

Post-reaction deactivation of the catalyst may be used to ensure a controlled termination of the reaction and avoid further molecular weight changes during any subsequent molding and/or characterization steps.

The temperature at which the reaction is carried out is chosen to aid in controlling the rate of reaction in order to minimize the time of formation for the desired composite polymer while allowing controlled polymerization and interchange of the monomer and polymer molecules to allow for uniform distribution of the filler. Typically, the temperature of the reaction is between about 20° C. and about 500° C. Preferably, the reaction temperature is between about 25° C. and about 400° C.

Mixing of the reagents during the polymerization and interchange reactions is typically applied through a controlled mechanical means such as a commercial reactor, mixing device, or extruder, the extruder may have a static mixer attached.

The composite polymers formed by the methods of the present invention are preferably processed into a commercially desirable form such as pellets through cutting or grinding procedures after the polymerization and interchange reactions have been terminated.

The novel methods of forming polymer composites of the present invention effectively increases the reinforcement of the material compared to purely mechanical mixing for the same mixing conditions. The properties of the polymer materials produced by the methods of the present invention become limited by a decrease in molecular weight as the fiber loading level increases due to an excess of initiating groups. Therefore, both the fiber loading level and the ratio of pre-formed material to lactide at the beginning of the reaction are important factors in designing a commercial process based on this new approach.

Additional objects, advantages, and novel features of this invention will become apparent to those skilled in the art upon examination of the following examples. Those of ordinary skill in the art will readily understand that these examples are not limiting on the invention as defined in the claims which follow.

EXAMPLES

The methods of the present invention are exemplified here by the formation of a polylactic acid (PLA)-cellulose composite polymer formed by an interchange reaction including transesterification of the lactide by the PLA in the presence of a transesterification catalyst.

L-lactide and pre-formed polylactide (PLA) were purchased from Cargill Dow Polymers, now NatureWorks, (Minnetonka, Minn.) and used without further purification. Lactide was dried under vacuum (22 inch Hg) at 50° C. for at least 8 hours prior to use. PLA was dried under vacuum (25 inch Hg) at 80° C. for at least 14 hours before being processed.

Figure 1:
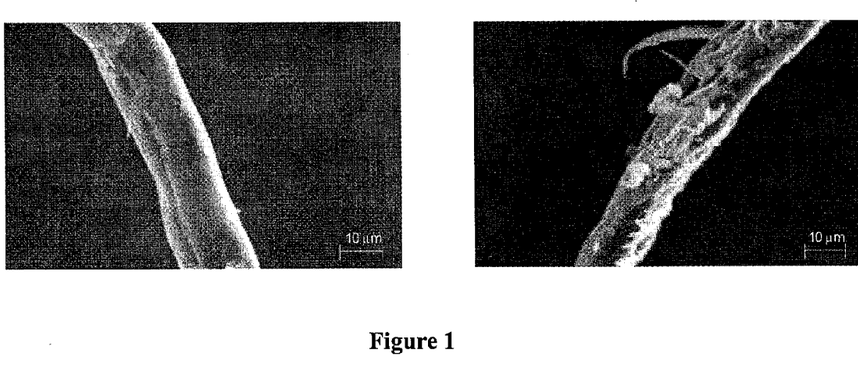
FIG. 1 is a SEM micrograph showing untreated fibers (left) and the fibers after alkali treatment (right).
Figure 2:
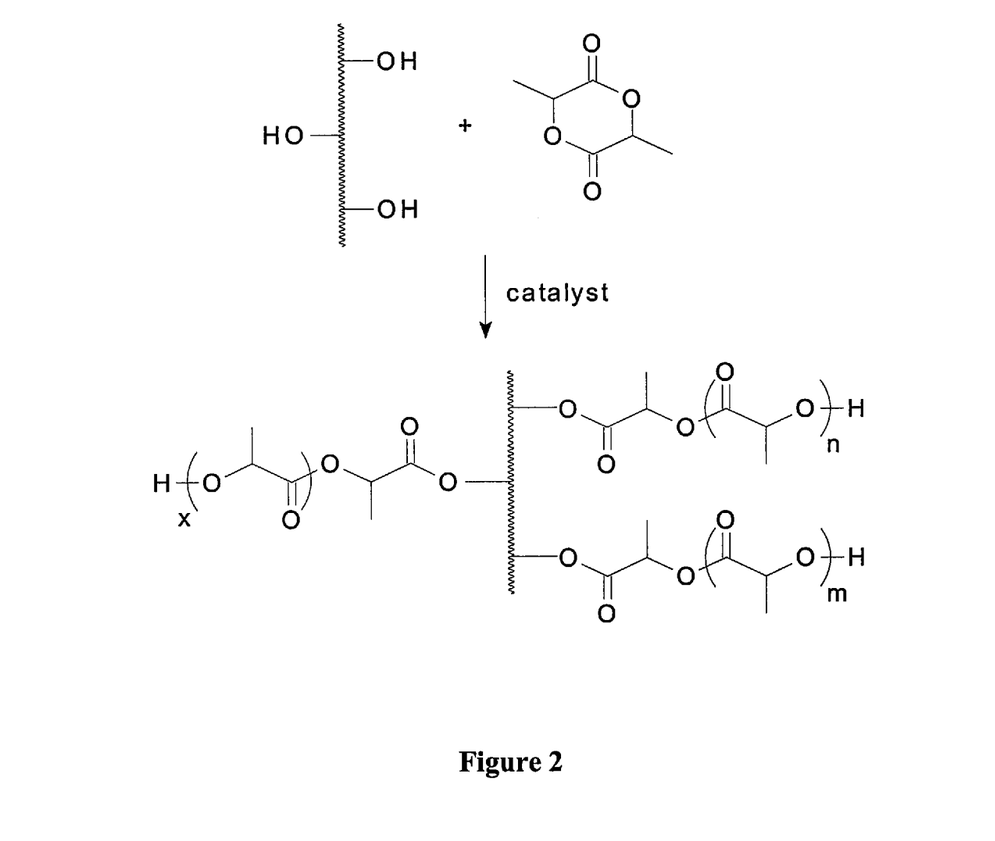
FIG. 2 is a chemical scheme for one embodiment of the present invention using a multifunctional initiator and the resulting polymer structure.
Figure 3:
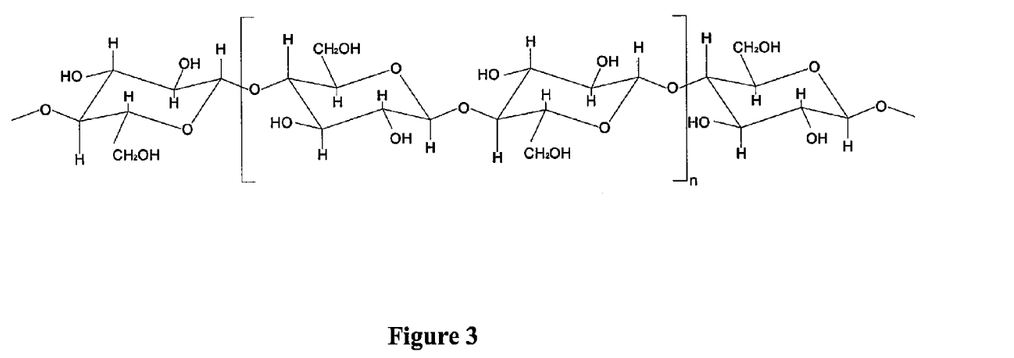
FIG. 3 shows the molecular structure of cellulose, exhibiting 6 hydroxyl groups available for initiating polylactic acid (PLA) polymerization as described in the Examples appended below.

The cellulose fibers used in this study (CreaTech TC 2500) were supplied by CreaFill Fibers Corp (Chestertown, Md.). These fibers have an average length of 900 μm and an average width of 20 μm (L:D ratio=45). In order to remove surface impurities and increase surface reproducibility, the fibers were pretreated according to the following procedure: 1) 10 g fibers were suspended in 500 ml aqueous solution of 8 wt % sodium hydroxide (NaOH), 2) the solution was placed in a sonicator for 6 hours at slightly elevated temperature (about 37° C.), 3) the fibers were then filtered and washed with distilled water until neutrality, 4) the washed and filtered fibers were dried in a convection oven at 70° C. for 24 hours, 5) before being used in the preparation of composites, the fibers were again dried under vacuum (25 inch Hg) at 80° C. for about 8 hours. Repeated washing with distilled water was found to be necessary in order to remove any degradation products of cellulose during the base treatment, since these by-products would cause the treated fibers to stick together and yellow upon drying. FIG. 1 shows the fibers before and after the pretreatment.

A special catalyst package was employed in the polymerization reaction. Commercially, PLA is polymerized from lactide that is produced from corn sugars by fermentation followed by reactive distillation. Various catalysts can be employed in the polymerization reaction. However, the most common catalyst used is the tin-compound stannous octoate $Sn(Oct)_2$. This catalyst requires hydroxyl groups as initiators, however, there is always a competition between natural initiators (residual water, alcohols) present in the starting materials and added initiators (compounds added to the system containing hydroxyl groups in order to initiate the reaction). Stannous octoate, $Sn(Oct)_2$, used in these reactions was obtained from Sigma Aldrich and used as received. The molar ratio, R, of lactide to stannous octoate for all reactions was R=2500. The co-catalyst triphenylphosphine, $P(\phi)_3$, has a beneficial effect on the polymerization kinetics of L-lactide in reactions with $Sn(Oct)_2$ as catalyst. $P(\phi)_3$ was purchased from Sigma Aldrich and added without further purification in an equimolar amount to $Sn(Oct)_2$. Titanium(IV) isopropoxide (TIP) was used as transesterificiation agent in samples containing pre-formed polymer (at a level of 0.1 wt % of PLA). For handling purposes, solutions of the catalyst and co-catalyst as well as the transesterificiation agent were prepared in dry, distilled toluene.

Samples were mixed and polymerized in a Haake Rheomix 3000. Polymerizations were performed at 200° C. for 20 minutes at 100 rpm. After melting and premixing lactide with the pre-formed PLA, the fibers were fed into the mixer. Once a reaction temperature of 200° C. was reached, the required amount of solution containing the catalyst and co-catalyst was added. At the end of the reaction time, the required amount of PAA solution was added and mixed with the material for at least a minute prior to extraction from the mixer. The catalyst was deactivated using poly(acrylic acid), PAA of a molecular weight of 2000 g/mol, (at a level of 0.25 wt % of lactide) purchased from Sigma Aldrich and dissolved in dioxane for transfer purposes.

After preparation, the material was stored in a freezer for at least 3 days prior to grinding in a Foremost 2A-4 grinder to a maximum particle size of about 5 mm with the vast majority of the pellets being about 2-3 mm in diameter. Samples for further testing were prepared by a combination of vacuum- and compression-molding. The material was first melted under vacuum (about 25 inch Hg) at 190° C. until the amount of gas released decreased significantly. Afterwards the material was compression molded at 180° C. for about 5 minutes under a load of 5000 psi and then quenched between water-cooled plates.

Samples were analyzed for glass transition temperature ($T_g$) and amount of crystallinity in a Perkin Elmer DSC-7. The machine was calibrated against an indium standard twice, and a baseline established on a daily basis. The DSC testing protocol was as follows: 1) heat from 5° C. to 200° C. at 10° C./min, 2) hold at 200° C. for 5 minutes, 3) cool from 200° C. to 5° C. at 5° C./min, 4) heat from 5° C. to 200° C. at 10° C./min. $T_g$ and amount of crystallinity were determined from data obtained on the second heating cycle by inflection point method.

Figure 6:
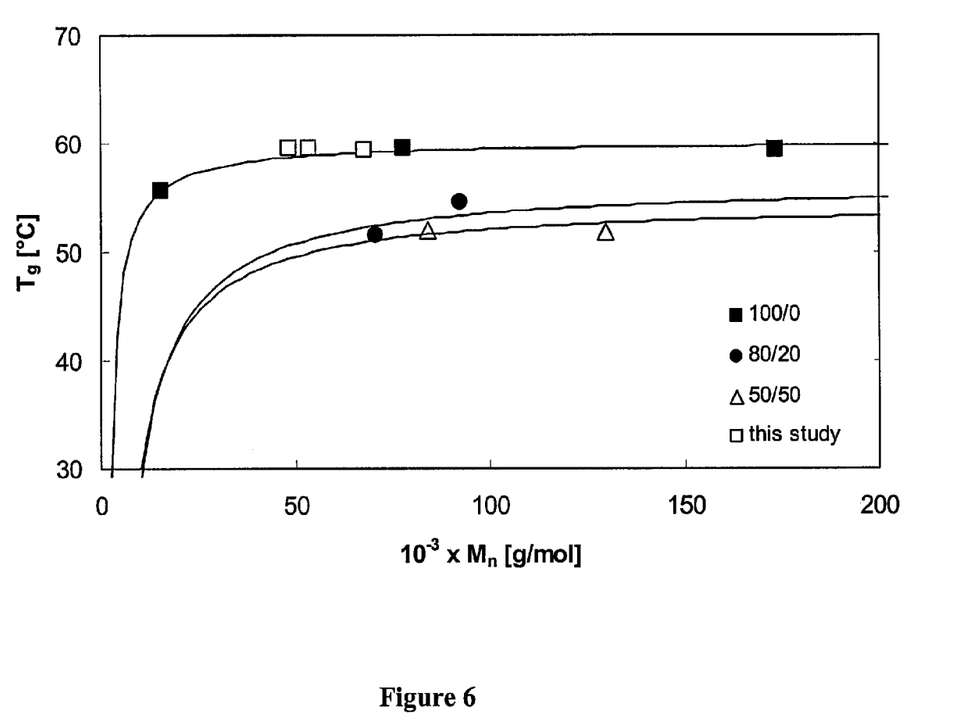
FIG. 6 is a graph of $T_g$ versus molecular weight for samples with various composition of L- and D-lactide.

The glass transition temperature ($T_g$) of samples containing no cellulose fibers and polymerized from L-lactide corresponds to previous studies that evaluated the influence of proportions of L- and D-lactide on the $T_g$. The Fox-Flory plot for PLA, shown in FIG. 6, demonstrates that the glass transition temperature increases with increasing molecular weight before reaching a plateau at about 59° C. at a molecular weight of about 50000 g/mol. The materials prepared in this study reach a molecular weight within the range of constant $T_g$ for 100% L-lactide.

Figure 7:
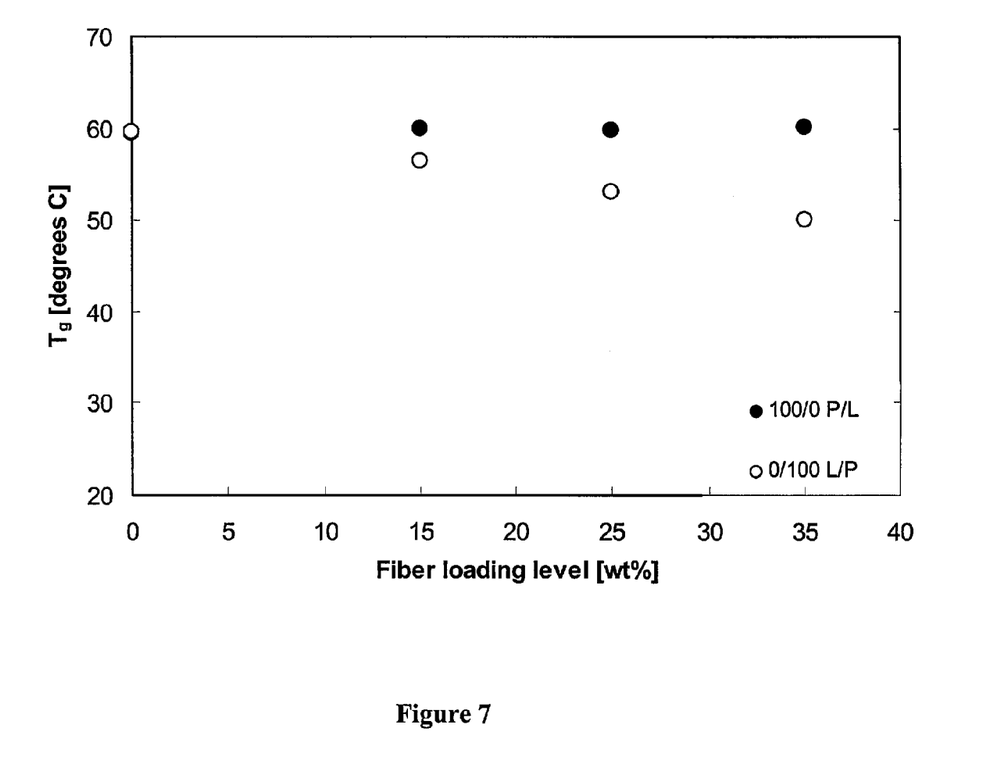
FIG. 7 is a graph of $T_g$ versus fiber loading level for samples containing only pre-formed PLA (100/0 P/L) and for samples completely polymerized in the presence of cellulose fibers (0/100 P/L) as described in the appended Examples.

The introduction of micro-sized cellulose fibers into a matrix of pre-formed PLA does not significantly affect the glass transition temperature as measured by DSC as shown in FIG. 7. This observation is consistent with previous studies. If no pre-formed PLA is present and the material is completely polymerized in the presence of cellulose fibers, then the glass transition temperature decreases with increasing fiber loading level, as shown in FIG. 7. According to the Fox-Flory equation, a decrease in the glass transition temperature is an indication of lower molecular weight:

$$T_g(\overline{M}_n) = A - \frac{B}{\overline{M}_n}$$

A and B in the above equation are constants, with $$A = \lim_{\overline{M}_n \to \infty} T_g(\overline{M}_n)$$

For 100% L-lactide PLA, values were determined to be: A=60.2° C., B=−71.1° C. g/mol. Therefore, with increasing fiber loading level, lower molecular weight PLA is produced due to an excess of initiating groups.

Figure 8:
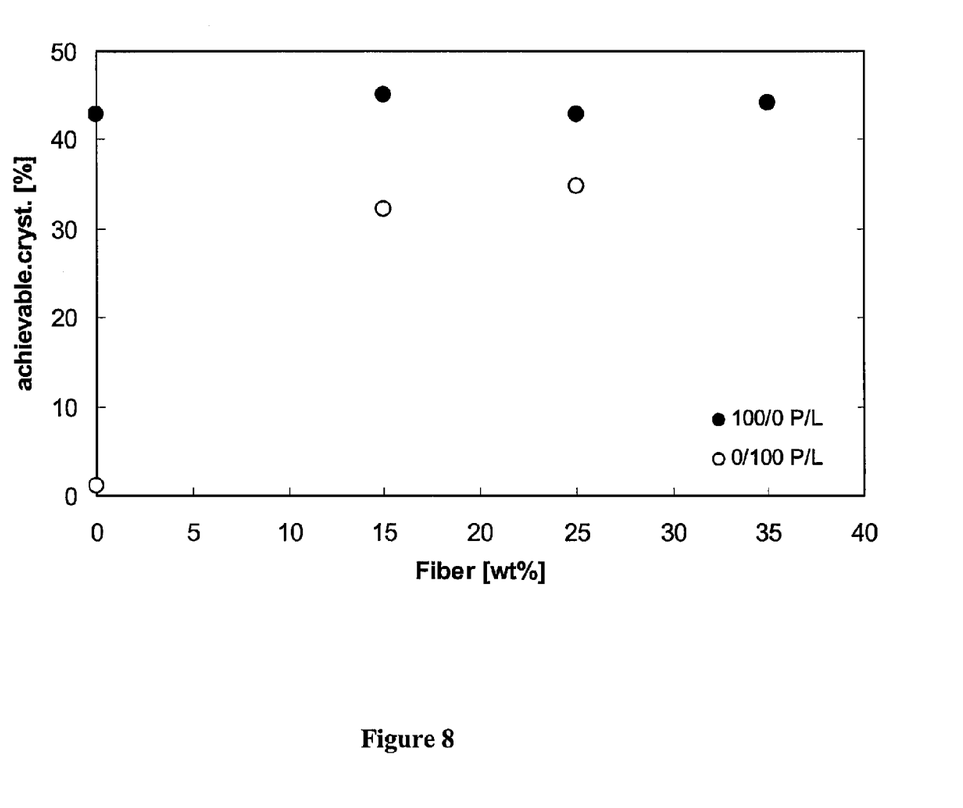
FIG. 8 is a graph showing the achievable crystallinity, as measured by DSC for samples containing only pre-formed PLA (100/0 P/L) and samples completely polymerized in the presence of cellulose fibers (0/100 P/L) as described in the appended Examples.

Achievable crystallinity was also determined by DSC and is shown versus the fiber loading level in FIG. 8. For samples containing only pre-formed PLA (100/0 P/L) no variation of the achievable crystallinity was observed, although an increase would be expected if the fibers serve as nucleation agent. The reason for this observation is the presence of talc in the pre-formed commercial material that already serves as nucleation agent. Samples completely polymerized from lactide (0/100 P/L) show a significantly lower percentage of achievable crystallinity for unfilled systems. As the fiber loading level increases, the achievable crystallinity increases for 0/100 P/L samples because the fibers can serve as nucleating agent.

Mechanical properties were determined by Dynamic Mechanical Thermal Analysis (DTMA) using an ARES Rheometer (TA Instruments, Piscataway N.J.) with torsional rectangular fixtures. Before testing, the machine was calibrated for normal force and torque. Test conditions were 0.1% strain and 1 Hz. The thermal scanning was performed as follows: 1) heat from 30° C. to 110° C. at 20° C./min, 2) hold for 5 minutes at 110° C., 3) cool from 110° C. to 30° C. at 20° C./min, 4) heat from 30° C. to 110° C. at 10° C./min (end condition: 30° C.). Moduli were determined from data on the first heating run.

Figure 9:
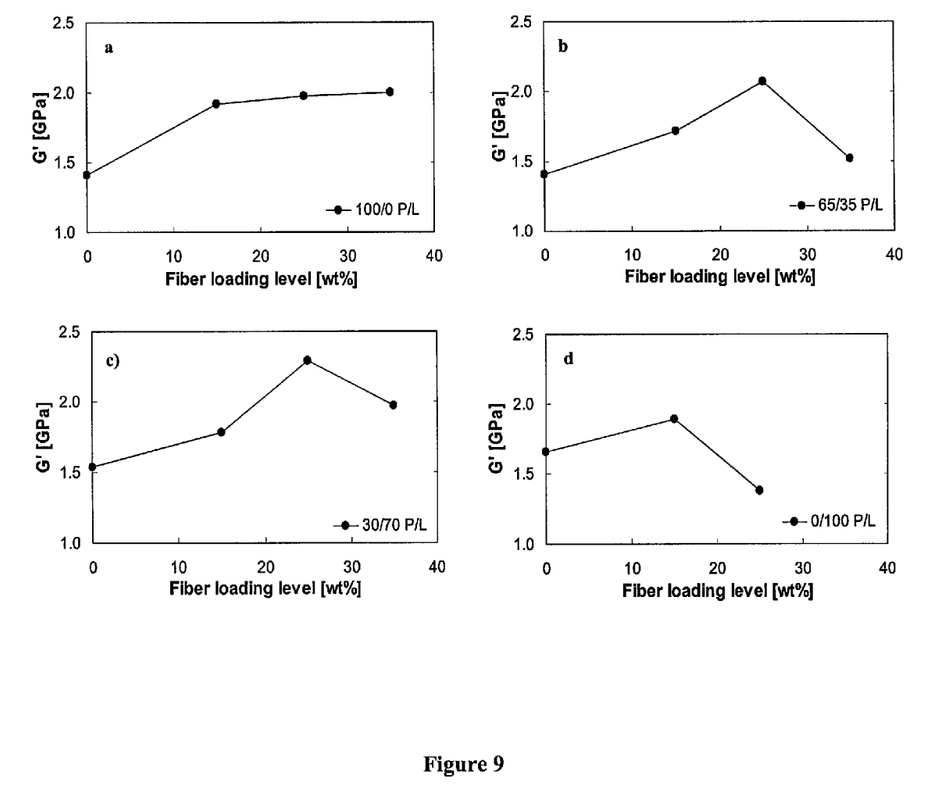
FIG. 9 includes graphs of the storage modulus versus fiber loading level for a) samples containing 100% pre-formed PLA, b) samples containing 65% pre-formed PLA and 35% lactide at the beginning of the reaction, c) samples containing 30% pre-formed PLA and 70% lactide at the beginning of the reaction, d) samples containing 100% lactide at the beginning of the reaction.

The measured values of the storage moduli G' are summarized in Table 1, and plots of the results are shown in FIG. 9. The modulus increases when pre-formed PLA is physically mixed with cellulose fibers (FIG. 9a); these results are consistent with previous studies. In the system containing 35% lactide, at the beginning of the reaction the modulus increases with the fiber loading level up to 25% by weight of the polymer mass; this is followed by a decrease in modulus for a further increase in fiber loading to 35% (FIG. 9b). This indicates a drop in molecular weight at the highest fiber loading level due to excess of initiating groups. However, the highest achievable modulus in this system exceeds G' achievable by purely mechanical mixing—there is a 43% increase with 35% fibers by physical mixing but a 50% increase with 25% fibers by reactive compatibilization. For systems containing 70% lactide at the beginning of the reaction (FIG. 9c), a similar trend was observed; an initial increase in G' with fiber loading level was followed by a decrease beyond 25% fibers due to an excess amount of initiating groups resulting in low molecular weight PLA. The reinforcement achievable in this system is better than in systems only relying on physical mixing or systems containing 35% lactide at the start of the reaction.

If the polymer is completely polymerized in the presence of the fibers, the modulus slightly increases for a fiber loading level of 15% followed by a sharp decrease at higher loadings (FIG. 9d). The material obtained with 35% fibers did not allow mechanical testing due to very low molecular weight. Overall, comparison of the moduli measured at 40° C. shows that the best reinforcement for this lactide-PLA-cellulose composite polymer is achieved at 25% fiber loading level in the presence of 30% pre-formed PLA.

TABLE 1

Summary of storage modulus G' for materials tested.

| Fiber loading level [wt %] | Modulus G' [GPa] | Reinforcement [%] |
|---|---|---|
| 100% preformed PLA, 0% lactide (100/0 P/L) | | |
| 0 | 1.4 | — |
| 15 | 1.9 | 36 |
| 25 | 1.9 | 36 |
| 35 | 2.0 | 43 |
| 65% preformed PLA, 35% lactide (65/35 P/L) | | |
| 0 | 1.4 | — |
| 15 | 1.7 | 21 |
| 25 | 2.1 | 50 |
| 35 | 1.5 | 7 |
| 30% preformed PLA, 70% lactide (30/70 P/L) | | |
| 0 | 1.5 | — |
| 15 | 1.8 | 20 |
| 25 | 2.3 | 53 |
| 35 | 2.0 | 33 |
| 0% preformed PLA, 100% lactide (0/100 P/L) | | |
| 0 | 1.6 | — |
| 15 | 1.9 | 19 |
| 25 | 1.4 | −22 |
| 35 | — | — |

The molecular weight of materials without fillers was determined by intrinsic viscosity measurements. Solutions of the material were prepared in tetrahydrofuran (THF) at concentrations of 0.005 g/ml and the viscosity of the polymer solution measured in an Ubbelohde viscometer at 30° C. The Schultz-Blaschke relationship allows a single-point determination of the intrinsic viscosity [η] from viscosity measurements of the pure solvent and the sample solution, given the Schultz-Blaschke coefficient $k_{SB}$ is known for the given polymer-solvent system at a constant temperature.

$$[\eta] = \frac{\eta_{sp}}{c*(1 + k_{SB}*\eta_{sp})}$$

In the Schultz-Blaschke equation, where c is the solution concentration in g/ml, $k_{SB}$ the Schultz-Blaschke coefficient, and $\eta_{sp}$ is the specific viscosity defined by $$\eta_{sp} = \frac{\eta}{\eta_0} - 1 = \frac{t}{t_0} - 1$$

where t and $t_0$ is the time necessary for the solution and the solvent, respectively, to pass through a defined part of the viscometer. The Schultz-Blaschke coefficient for PLA in THF at 30° C. was previously determined to be 0.298±0.005.

Knowing the intrinsic viscosity, the viscosity average molecular weight can be calculated by rearranging the Mark-Houwink equation $$M_v = \left(\frac{[\eta]}{K}\right)^{\frac{1}{a}}$$

The parameters in this equation, K and a, are also specific for the polymer-solvent system at a given temperature.

The Stockmayer-Fixman equation allows the calculation of the weight-average molecular weight and appears as $$\frac{[\eta]}{\overline{M}_w^{1/2}} = K_\Theta + b * \overline{M}_w^{1/2}$$

The factor $K_\Theta$ (Mark-Houwink constant for theta-conditions) is an experimental quantity often used to quantify unperturbed polymer chain dimensions in dilute solutions. Values reported in the literature show a large variability. However, careful experiments have determined this constant $K_\Theta$ to be 0.107±0.022 mL/g.

Figure 4:
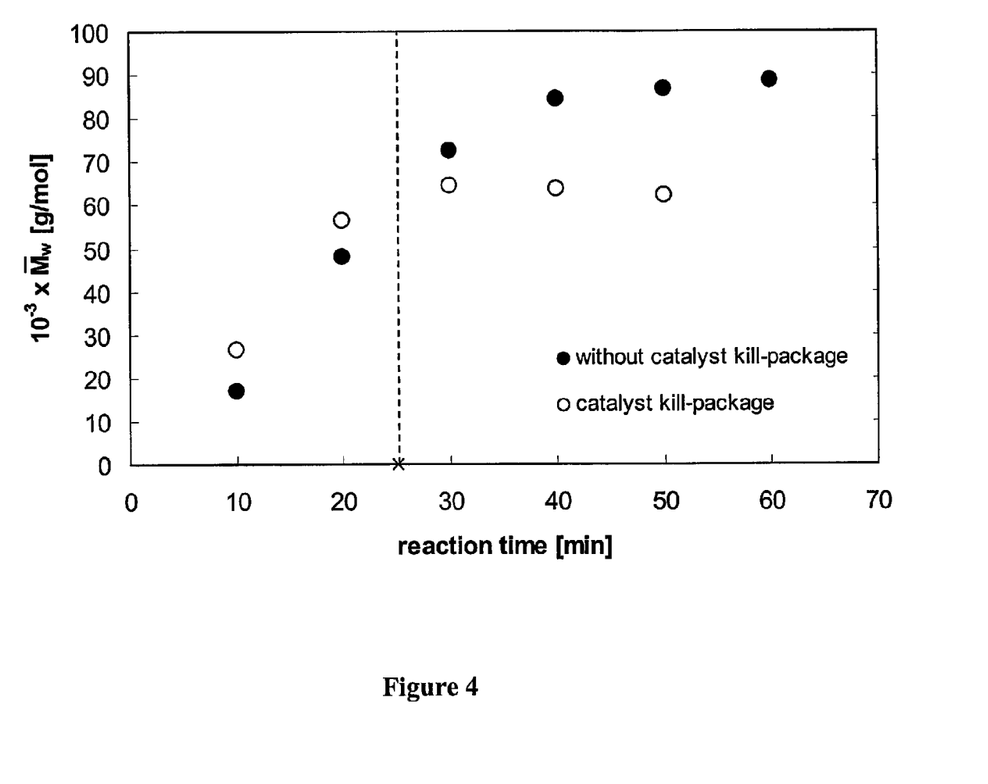
FIG. 4 is a graph of the molecular weight development as a function of reaction time with and without the addition of PAA. (Experimental conditions: 180° C., addition of PAA after 25 minutes reaction time).

Post-reaction deactivation of the catalyst produced a controlled termination of the reaction while avoiding further molecular weight changes during molding and characterization measurements. Samples were collected during the polymerization of PLA and the molecular weight determined as a function of time as a means of assessing the effectiveness of polyacrylic acid (PAA) as a reaction-stopping reagent. As shown in FIG. 4, PAA is very effective in deactivating $Sn(Oct)_2$ compared to a control sample. There is no further increase in molecular weight after the addition of PAA to the system, while the final molecular weight without PAA addition is not reached within an hour under the present experimental conditions.

Figure 5:
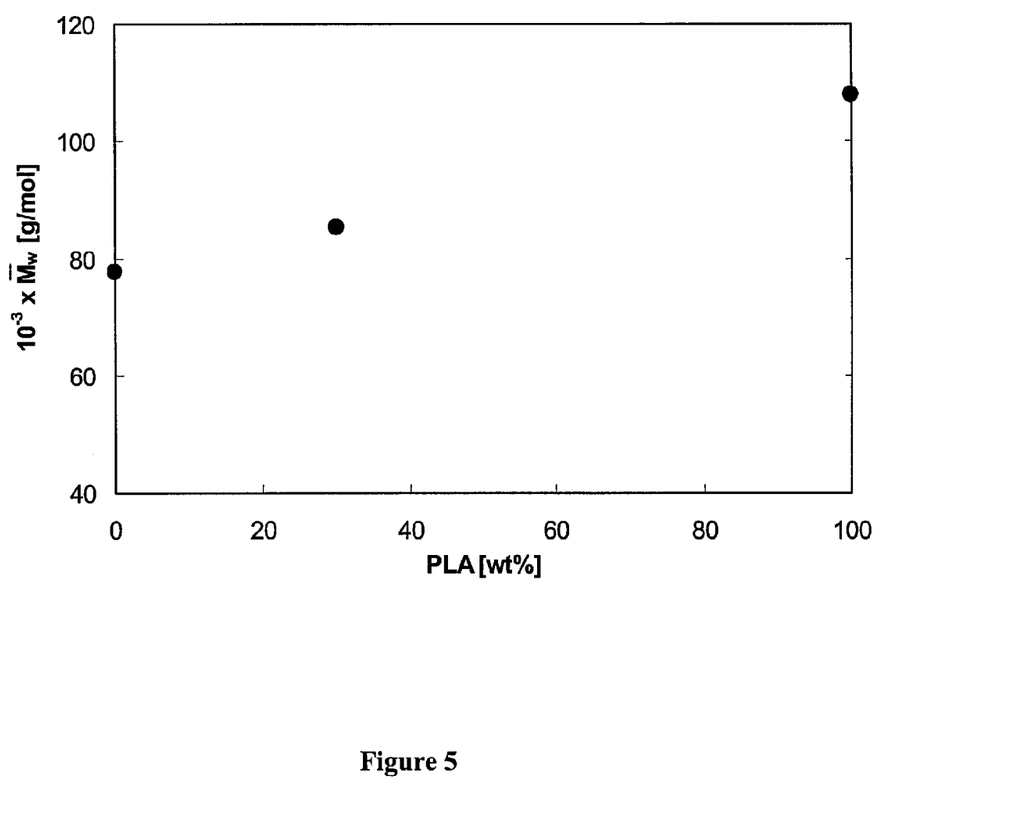
FIG. 5 is a graph showing that the introduction of pre-formed polymer increases the molecular weight (Experimental conditions: 200° C., 20 minutes reaction time).

The average molecular weight of samples that are completely polymerized in the Haake reaches about 77600 g/mol, whereas the pre-formed material is of a molecular weight of 108100 g/mol after processing for 20 minutes at 200° C. in the presence of TIP. As expected, the introduction of pre-formed polymer to the PLA synthesis leads to an increase in average molecular weight as depicted in FIG. 5.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method comprising:
   mixing a filler simultaneously with a monomer and a pre-formed polymer, wherein the monomer reacts to form a grafted polymer layer on the surface of the filler,
   wherein an interchange reaction takes place between the grafted polymer layer on the surface of the filler and the pre-formed polymer to form a composite polymer;
   wherein the monomer is a lactide and the pre-formed polymer is polylactide
   wherein the mixing is conducted in the presence of a catalyst that catalyzes the interchange reaction between the monomer and the pre-formed polymer on the surface of the filler.

2. The method of claim 1, further comprising stopping a polymer reaction by contacting the pre-formed polymer with a compound that deactivates the catalyst.

3. The method of claim 1, wherein the catalyst is selected from the group consisting of titanium(IV) isopropoxide (TIP), dibutyl tin oxide (DBTO), an alkyl tin(IV) compound, monobutyltin trichloride ($BuSnCl_3$), and TBD (1,5,7-triazabiscyclo[4.4.0]dec-5-ene).

4. The method of claim 1, wherein the catalyst is an acid catalyst, wherein the acid catalyst is selected from the group consisting of sulfonic acids, and sulfuric acids.

5. The method of claim 1, wherein the catalyst is a base catalyst, wherein the base catalyst is selected from the group consisting of sodium methylate, sodium methoxide, potassium methoxide, sodium hydroxide, potassium hydroxide and organic base catalysts.

6. The method of claim 5, wherein the organic base catalyst is selected from the group consisting of triethylamine, piperidine, 1,2,2,6,6-pentamethylpiperidine, pyridine, 2,6-di-tert-butylpyridine, 1,3-disubstituted tetrakis(fluoroalkyl)distannoxanes, 4-dimethyl-aminopyridine (DMAP) and guanidine.

7. The method of claim 1, wherein the catalyst is selected from the group consisting of basic zeolites, cesium-exchanged NaX faujasites, mixed magnesium-aluminum oxides, magenesium oxide and barium hydroxide, 4-(dimethylamino)pyridine (DMAP), 4-pyrrolidinopyridine (PPY), salts of amino acids, enzyme transesterification catalysts, alkaline metal alkoxides and alkaline metal hydroxides.

8. The method of claim 1, wherein total lactide is present at a concentration of 35 wt % as the lactide monomer and a concentration of 65 wt % as the polylactide pre-formed polymer.

9. A method comprising:
   mixing cellulose fibers with lactide and polylactide to form a premix;
   contacting the premix with a composition comprising stannous octoate, triphenylphosphine, and titanium isopropoxide, to produce a composite polymer;
   contacting the composite polymer with polylactide to form a stabilized composite polymer.

* * * * *